United States Patent
Costabel

(10) Patent No.: US 6,483,506 B1
(45) Date of Patent: Nov. 19, 2002

(54) SYSTEM AND METHOD FOR GENERATING COMPUTER ANIMATED GRAPHICAL IMAGES OF A VASCULAR STRUCTURE ATTACHED TO AN ANATOMICAL STRUCTURE

(75) Inventor: Paolo Costabel, Culver City, CA (US)

(73) Assignees: Sony Corporation, Tokyo (JP); Sony Pictures Entertainment, Culver City, CA (US)

( * ) Notice: Subject to any disclaimer, the term of this patent is extended or adjusted under 35 U.S.C. 154(b) by 326 days.

(21) Appl. No.: 09/620,631

(22) Filed: Jul. 20, 2000

(51) Int. Cl.[7] .............................................. G06T 17/00
(52) U.S. Cl. ....................... 345/419; 345/420; 345/646; 345/647; 345/473
(58) Field of Search ................................ 345/419, 420, 345/423, 424, 426, 427, 582, 619, 646, 647, 648, 473; 382/128, 154

(56) References Cited

U.S. PATENT DOCUMENTS 6,151,404 A * 11/2000 Pieper ........................ 382/128

OTHER PUBLICATIONS

Wilhelms, Animals with Anatomy. IEEE Computer Graphics and Applications, 17(3):22–30, May 1997.*
Wilhelms, et al., "Anatomically Based Modeling", *Computer Graphics Proceedings,* Annual Conference Series, 1997.

* cited by examiner

*Primary Examiner*—Almis R. Jankus
(74) *Attorney, Agent, or Firm*—Haverstock & Owens LLP

(57) ABSTRACT

A process for generating animated graphical images of a vascular structure attached to an anatomical structure includes the steps of: generating and arranging a plurality of anatomical patches in rest positions to form an anatomical patch surface representing an anatomical structure disposed in a rest position; and generating and arranging at least one vascular patch over the anatomical structure in the rest position, the vascular patch having an associated array of control points configured to form a closed surface of a vascular structure having a closed transverse cross section; and establishing a binding positional relationship between at least a portion of the control points and the anatomical patch surface by determining binding points on the surface of at least one selected anatomical patch in a rest position. The control points of each vascular patch include at least one transverse cross-sectional subset of control points that are disposed proximate an associated transverse cross-section of the vascular structure, each control point of the subset having a common binding point. The common binding point is located at a closest point on the surface of the selected anatomical patch to a selected one of the control points of the transverse cross-sectional subset. The process provides for generating images of a vascular structure attached to an animated anatomical structure, wherein the vascular structure is modeled by parametric surface patches, wherein the vascular layer may have an elastic quality, and wherein the transverse cross section of the vascular structure is not flattened during animation.

30 Claims, 6 Drawing Sheets

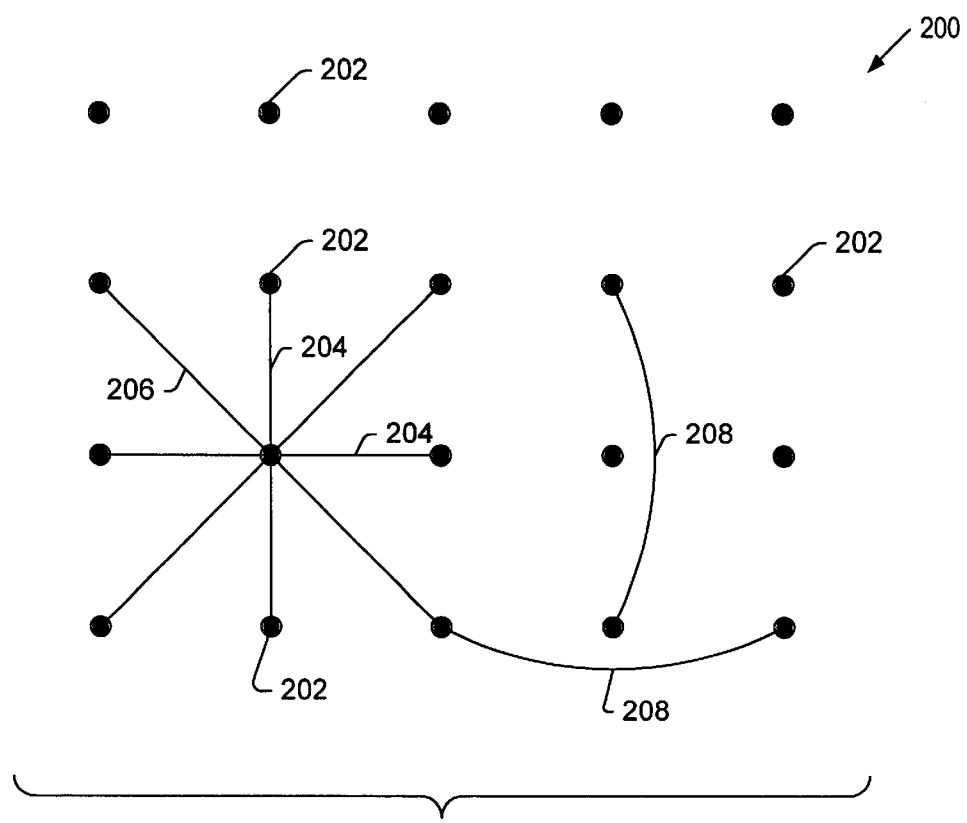
FIG. 4
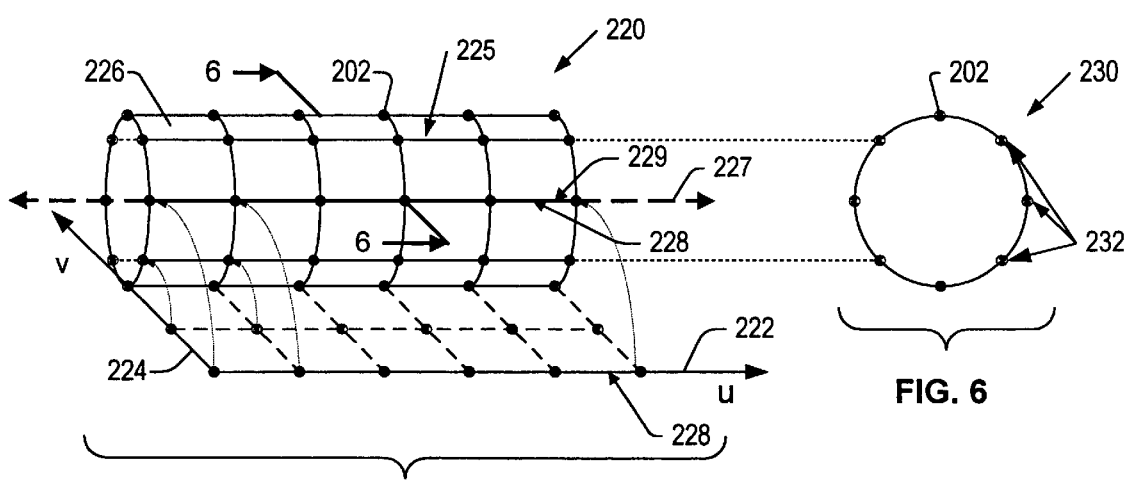
FIG. 5
FIG. 6

SYSTEM AND METHOD FOR GENERATING COMPUTER ANIMATED GRAPHICAL IMAGES OF A VASCULAR STRUCTURE ATTACHED TO AN ANATOMICAL STRUCTURE

BACKGROUND OF THE INVENTION

1. Field of the Invention

The present invention relates generally to the field of computer animation. More particularly, the present invention relates to a system and method for generating computer animated graphical images of a vascular structure attached to an anatomical structure.

2. Description of the Prior Art

Computer animation techniques have been used for generating animated images of animal bodies including human bodies. For various applications in the field of medicine, including medical training, it is useful to generate animated images of various anatomical elements of an animal such as bones, muscles, vascular tissue, and other tissue. Such animated images are also useful in special effects applications for motion pictures.

The present application is concerned primarily with generating computer animated images of a vascular structure attached to an anatomical structure (e.g., bones, muscles, and other tissue) as the anatomical structure moves in accordance with an animated sequence. Prior art methods for generating computer animated images of a layer of skin superimposed over an underlying structure provide some background information for the development of computer animated images of a vascular structure. However, as further explained below, special problems arise in modeling a vascular structure attached to an anatomical structure that do not arise in modeling a layer of skin superimposed over an underlying anatomical structure.

Anatomically Based Modeling is discussed in detail in an article of the same title written by Jane Wilhelms and Allen Van Gelder of the University of California, Santa Cruz, and published in Computer Graphics Proceedings, Annual Conference Series, 1997. This reference describes a method for modeling skin deformation in response to deformation of anatomical elements which are modeled as triangle meshes or ellipsoids. Skin overlying the anatomical elements is modeled by a triangle-mesh of skin vertices which is attached to the anatomical elements by anchors.

The anatomically based modeling process described by Wilhelms and Van Gelder includes the steps of: defining springs between associated skin vertexes of the triangle-mesh skin; binding each skin vertex with a closest anatomical body component (muscle, bone, or generalized tissue) in accordance with an anchoring method; animating the anatomical body causing the anatomical body components to be moved; moving the skin vertexes of the triangle-mesh skin based on the movement of the body components and the anchoring, the movement causing corresponding springs to deform and therefore exert restoring forces on the skin vertexes; and resolving the spring forces during a relaxation phase of the process.

The springs, which are mathematical functions defining a potential force between the associated vertices as a function of the distance therebetween, provide for achieving a natural elasticity in the skin as it stretches over the animated understructure.

Wilhelms and Van Gelder describe a binding phase in the above cited reference wherein selected points of the layer of skin are bound to associated points on the underlying anatomical structure. An anchor of a particular skin vertex is defined to be the nearest point on its underlying component. A virtual anchor, defined as the initial position of a skin vertex relative to its anatomical component, is the position of the vertex when the skin is extracted in the animal's rest position. The anchors and virtual anchors are stored parameterized in the local space of the component. As shape changes occur in the anatomical components, the skin vertices are correspondingly affected via the anchors and virtual anchors. Each skin vertex is considered to be bound to its virtual anchor.

Special problems arise in binding a vascular structure to an anatomical structure that do not arise in binding a layer of skin to an anatomical structure primarily because a vascular structure has a substantially cylindrical surface, and a substantially circular transverse cross section, while a layer of skin has a substantially planar, albeit curved, surface. As muscles flex and skeletal elements are moved during animation, it is desirable that the vascular tissue attached thereto have an elastic quality in order to appear natural. It is also very important that the vascular structures not be flattened as they are flexed and bent during movement of the anatomical structures. However, if a vascular structure is bound to an anatomical structure in accordance with the method described by Wilhelms and Van Gelder, the vascular structure is flattened during animation of the underlying anatomical structure.

Another problem associated with the anatomically based modeling process described by Wilhelms and Van Gelder is that the exterior object, that is the layer of skin, is modeled using a triangle mesh of vertices. Polygonal models such as a triangle mesh of vertices are useful primarily for representing objects having flat surfaces, but fall short in allowing the degree of flexibility required for representing curved bodies having complex details. By contrast, parametric surfaces afford great flexibility by providing modelers with intuitive control parameters that make manipulating them fairly natural. Many different types of parametric surfaces, or patches, are commonly used by modelers for representing curved surfaces. One type of parametric surface commonly used by modelers is the non-uniform rational B-spline surface (NURBS) patch. A NURBS patch has a resolution defined by an associated number of control vertex (CV) points which are arranged in an array and which provide a "control hull" of the patch.

In order to achieve optimal realism in computer animated images of a vascular structure, it is desirable to be able to model a vascular structure using parametric surfaces which provide a high degree of flexibility. It would also be desirable to provide an anatomically based modeling process having the advantages of the process described by Wilhelms and Van Gelder, but using a parametric surface model for the vascular structure, wherein the parametric surface is formed by a plurality of patches some of which have different resolutions defined by a different number of CV points.

What is needed is a system and method for generating realistic animated graphical images of a vascular structure stretching attached to an animated anatomical structure, wherein the vascular structure is modeled by parametric surface patches, wherein the vascular structure may have an elastic quality, and wherein the transverse cross section of the vascular structure is not flattened during animation.

SUMMARY OF THE INVENTION

It is an object of the present invention to provide a system and method for generating realistic animated graphical images of a vascular structure attached to an animated anatomical structure, wherein the vascular structure is modeled by parametric surface patches, wherein the vascular layer may have an elastic quality, and wherein the transverse cross section of the vascular structure is not flattened during animation.

Briefly, a presently preferred embodiment of the present invention provides a process for generating animated graphical images of a vascular structure attached to an anatomical structure. The process includes the steps of: generating and arranging a plurality of anatomical patches in rest positions to form an anatomical patch surface representing an anatomical structure disposed in a rest position; and generating and arranging at least one vascular patch over the anatomical structure in the rest position, the vascular patch having an associated array of control points configured to form a closed surface of a vascular structure having a closed transverse cross section. In one embodiment, the control points of each of the vascular patches are configured to form a substantially cylindrical surface of a vascular structure having a substantially circular transverse cross section.

The process also includes the step of establishing a binding positional relationship between at least a portion of the control points and the anatomical patch surface by determining binding points on the surface of at least one selected anatomical patch in a rest position. In accordance with the present invention, the control points of each vascular patch include at least one transverse cross-sectional subset of control points that are disposed proximate an associated transverse cross-section of the vascular structure, each control point of the subset having a common binding point. The common binding point is located on a closest point on the surface of the selected anatomical patch to a selected one of the control points of the transverse cross-sectional subset.

The process further includes the steps of: animating the anatomical structure causing a translation in the position of the selected anatomical patch relative to the rest position, and resulting in a translated anatomical patch surface; and deforming the vascular patch by moving at least a portion of the control points of the vascular patch based on the associated binding positional relationships and the translation in the position of the selected anatomical patch.

In an embodiment, at least one intra-patch spring may be defined between a corresponding pair of selected control points of at least one of the vascular patches. Each intra-patch spring defines a potential force between the corresponding pair of selected control points. The step of deforming the vascular patch by moving at least a portion of the control points results in at least a portion of the springs being deformed causing spring restoring forces to be exerted on associated ones of the control points. Spring restoring forces are computed and resolved to determine a relaxed position for each of the control points.

The step of establishing a binding positional relationship between each of the control points and the associated closest anatomical patch in the rest position further includes determining an anchor point associated at least a portion of the control points. Each anchor point defines the location of the associated control point relative to its associated binding point with the associated closest anatomical patch being disposed in the rest position. The step of moving each of the control points based on the binding positional relationships further includes determining a moved position for each of the control points based on the associated binding point, the associated anchor point, and a displacement in the position of the associated closest anatomical patch.

In an embodiment, each of the anatomical patches is a non-uniform rational B-spline (NURBS) patch having a (u,v) coordinate system defining a u-direction and a v-direction relative to the NURBS patch. In this embodiment, the step of determining an anchor point associated with each of the control points of the subset further includes: determining a normal vector that is normal to the surface of the associated closest anatomical patch at the associated binding point; determining a u-tangent to the surface of the associated closest anatomical patch along the u-direction at the associated binding point; determining a v-tangent to the surface of the associated closest anatomical patch along the v-direction at the associated binding point, the normal vector, the u-tangent, and the v-tangent defining an associated binding point reference coordinate system for the associated anchor point; and defining the position of the anchor point relative to the binding point using the associated binding point reference coordinate system.

The step of establishing a binding positional relationship further includes the step of generating and storing anchor point mapping information associated with each of the vascular control points. The anchor point mapping information includes: patch information indicative of the associated selected anatomical patch; binding point information indicative of the associated binding point; and anchor point position information indicative of the position of the anchor point relative to the binding point in terms of the associated binding point reference coordinate system of the associated selected anatomical patch in the rest position.

The step of moving each of the control points based on the associated binding positional relationship includes: reading the patch information and the binding point information associated with a particular one of the control points; determining a displaced binding point reference coordinate system by determining a displaced normal vector, a displaced u-tangent, and a displaced v-tangent to the surface of the associated selected anatomical patch at the associated binding point with the selected anatomical patch being in the displaced position relative to the associated rest position; reading the anchor point position information associated with the particular control point; and determining a moved position of the particular control point based on the anchor point position information and the displaced reference coordinate system.

An important advantage of the system and method of the present invention is that it provides for generating high quality graphical images of a vascular structure attached to an animated anatomical structure, wherein the vascular structure is modeled by parametric surface patches, wherein the vascular layer may have an elastic quality, and wherein the transverse cross section of the vascular structure is not flattened during animation.

The foregoing and other objects, features, and advantages of the present invention will be apparent from the following detailed description of the preferred embodiment which makes reference to the several figures of the drawing.

IN THE DRAWING

FIG. 4 is a block diagram generally illustrating different types of springs defining potential forces between CV points of the vascular patches;

FIG. 5 is a perspective view of a vascular patch having an array of CV points defining a control hull configured to form a substantially cylindrical surface of a vascular structure having a closed transverse cross section;

FIG. 6 is a transverse cross sectional view of the vascular structure of FIG. 5;

Figure 7:
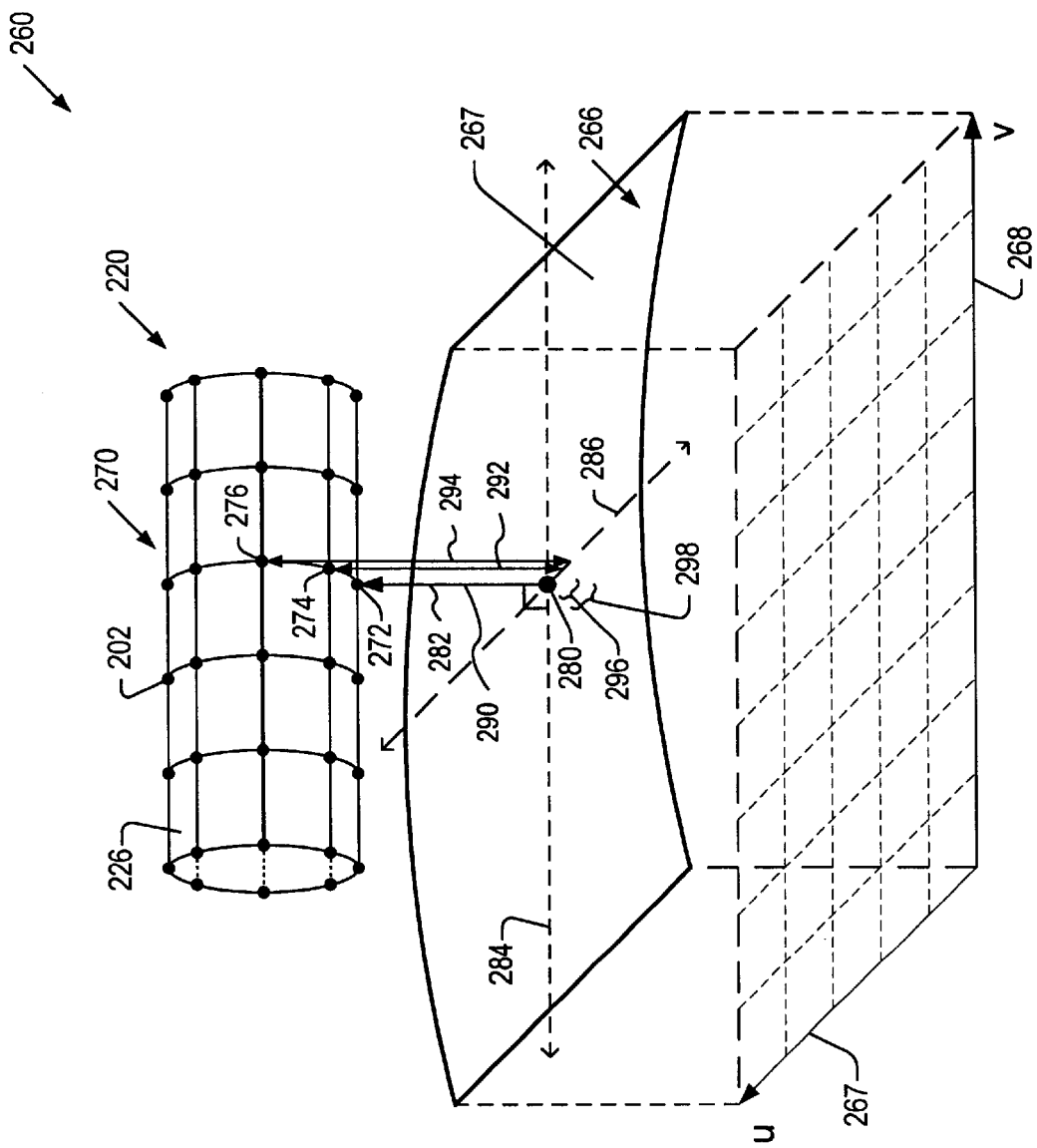
Figure 8:
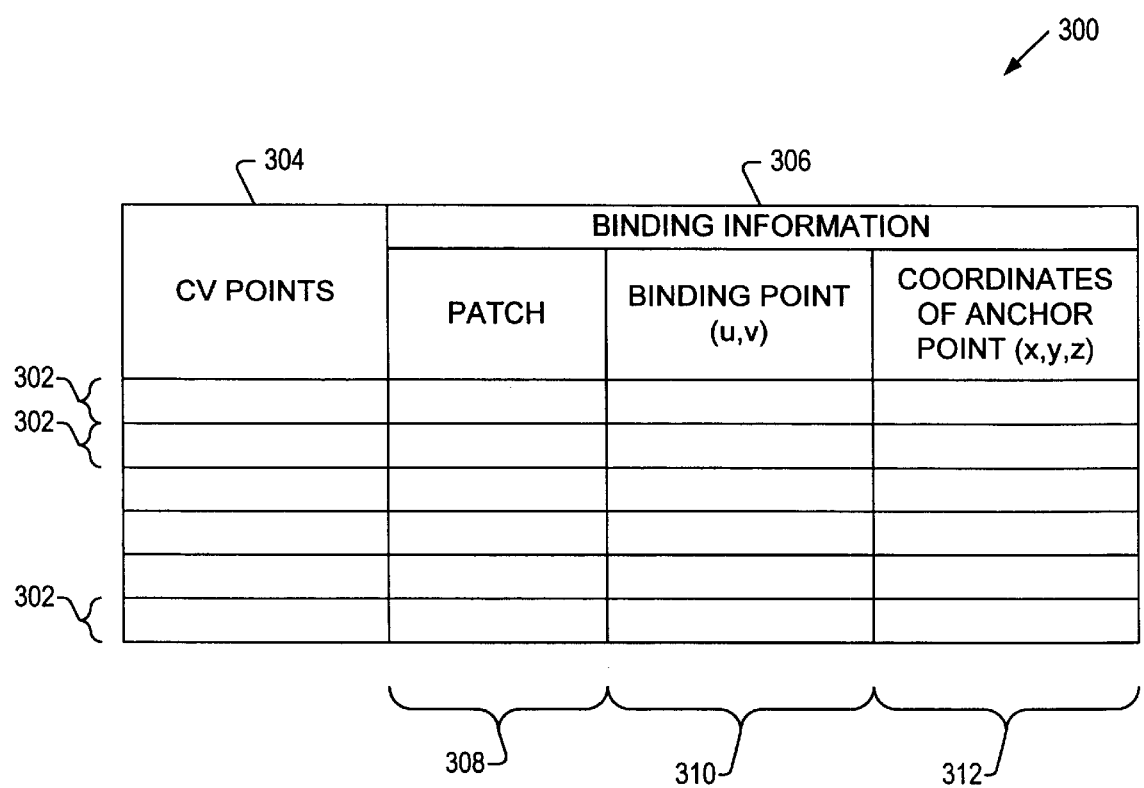

FIG. 7 is a perspective view of a vascular patch forming a vascular structure disposed proximate a top surface of an associated closest anatomical patch, the view illustrating binding positional relationships between anchor points of the vascular patch and associated binding points on the surface of the closest anatomical patch; and FIG. 8 is a table diagram generally illustrating binding map information generated based on the binding positional relationships between the anchor points and associated binding points.

DETAILED DESCRIPTION OF THE PREFERRED EMBODIMENTS

Figure 1:
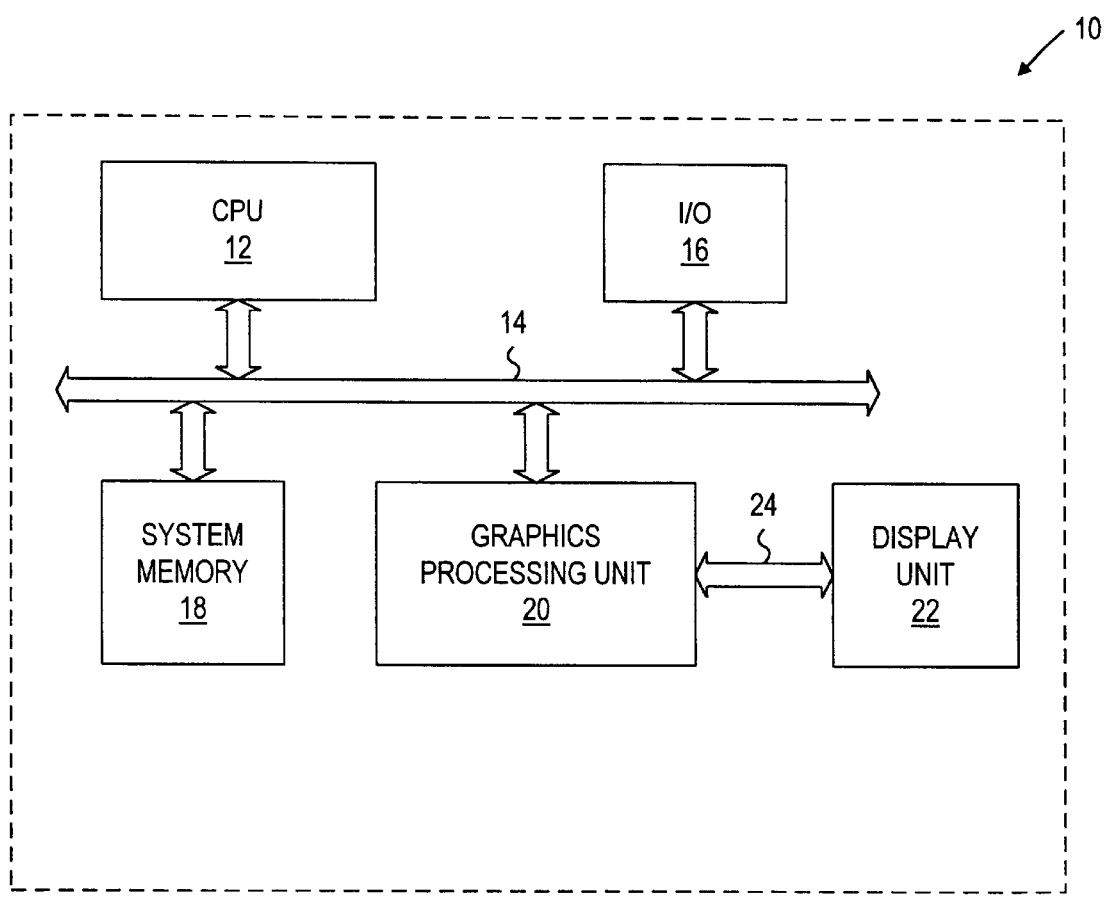
FIG. 1 is a generalized block diagram illustrating a computer graphics system that may be used to execute a process for generating computer animated graphical images of a vascular structure attached to an anatomical structure in accordance with the present invention.

FIG. 1 shows a generalized block diagram illustrating a computer graphics system at 10 that may be used to execute a process for generating animated graphical images of a vascular patch surface of a vascular structure attached to an animated anatomical structure in accordance with the present invention as further explained below. The computer graphics system 10 generally includes: a central processing unit (CPU)12 communicatively coupled with a system bus 14; an input/output unit 16, a system memory unit 18, and a graphics processing unit 20 each being communicatively coupled with the CPU 12 via the system bus 14; and a display unit 22 communicatively coupled with the graphics processing unit 20 via an interface 24. In one embodiment, the system 10 is a computer graphics work station. In operation, the graphics processing unit 20 receives image display instructions and image data from clients such as the CPU via the system bus, and executes the instructions resulting in the generation of image data. The graphics processing unit 20 typically includes a 3D graphics pipeline (not shown) for generating data in the form of object descriptions. Object surfaces are formed by one or more primitive surfaces selected from different types of primitives including quadric surfaces, polygons, and parametric surfaces.

The process of the present invention may be used in conjunction with a 3D animation software tool executed by the computer graphics system 10. Examples of 3D animation software tools include Maya by Alias Wavefront which is a wholly owned subsidiary of Silicon Graphics, Inc., and RenderMan™ by Pixar. In one embodiment, important steps of the process of the present invention are implemented as a Maya plug-in, that is a software module compatible with Maya, comprising computer readable instructions for executing the process. In this embodiment, a graphics modeler may create animated images in accordance with the present invention using the Maya software tool package in conjunction with the vascular effect plug-in of the present invention. However, it will be understood by those skilled in the art that the process of the present invention may be implemented in accordance with any other 3D animation software tools. Also, it will be understood by those skilled in the art that the process of the present invention can also be implemented using hardware logic modules adapted to execute the steps further described below.

Figure 2:
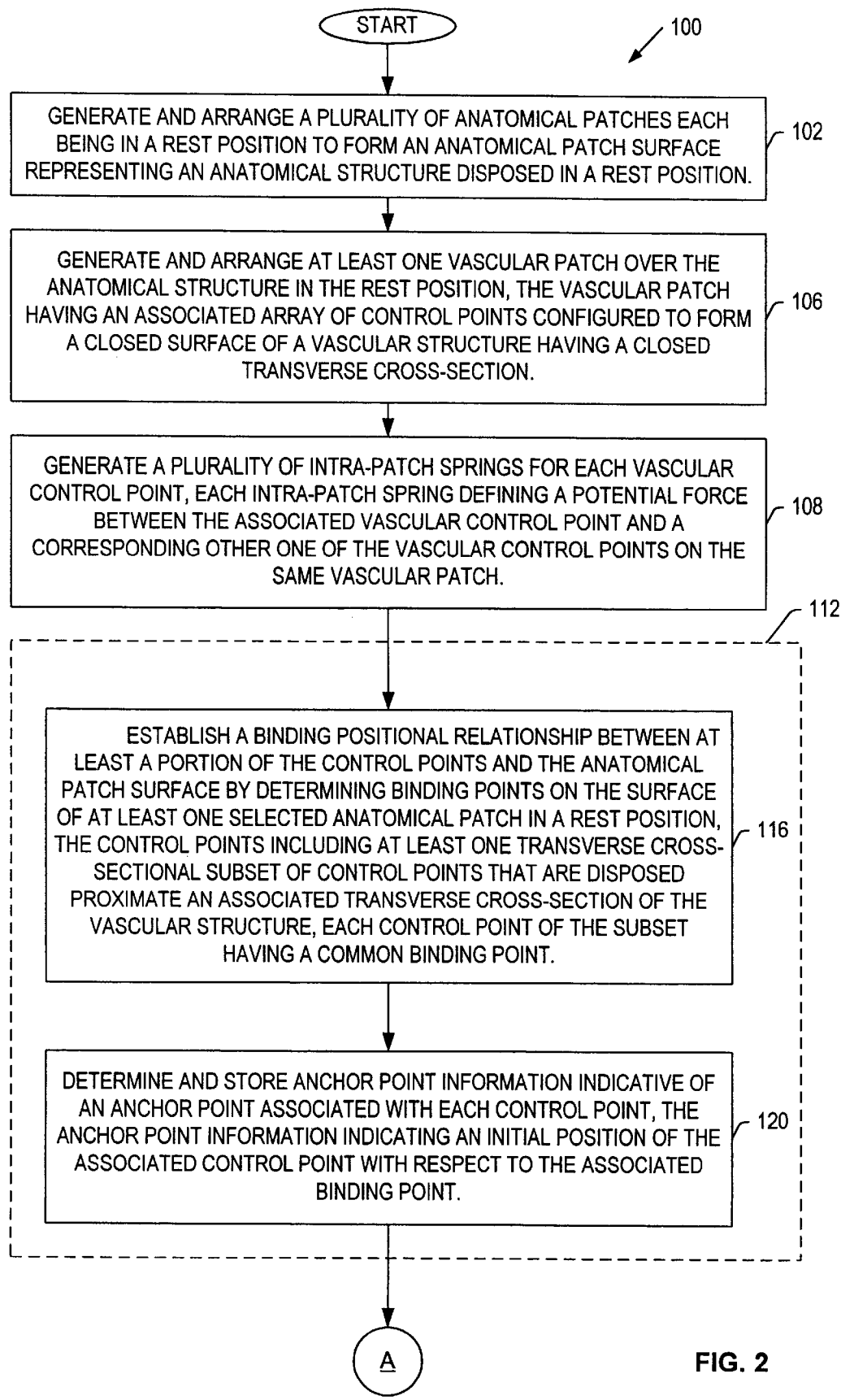
FIGS. 2 and 3 are flow diagrams generally illustrating the process of the present invention which includes a step of binding control vertex (CV) points of each of a plurality of vascular patches to the anatomical structure.

FIG. 2 shows a flow diagram generally illustrating a process at 100 for generating computer animated graphical images of a vascular structure attached to an anatomical structure. In a preferred embodiment of the present invention, the anatomical structure is an anatomical structure of a human being or animal which may include skeleton objects, ligament objects, muscle objects, and other tissue. Note however that the process may be used to generate animated graphical images of any type of closed surface structure attached to any type of animated structure. The process 100 is executed by an animation system in accordance with the present invention which may be implemented as computer readable instructions stored in the system memory 18 and executed by a processor of the computer graphics system 10 (FIG. 1).

The process 100 begins with a step 102 in which the animation system generates and arranges a plurality of anatomical patches disposed in rest positions to form an anatomical patch surface representing an anatomical structure disposed in a rest position. Each of the anatomical patches is defined by a parametric surface. In an embodiment, each of the anatomical patches is generated as a non-uniform rational B-spine surface (NURBS) patch having an associated array, or "hull", of anatomical control vertex (CV) points. In an alternative embodiment, each of the anatomical patches may be generated as a cubic Bezier patch or any other suitable type of parametric surface primitive. A NURBS patch, which is basically a tensile product of two B-spines, provides a modeler with a high degree of flexibility that is required for representing highly detailed curved bodies. The anatomical NURBS patches may be defined using a software tool such as MAYA or RenderMan.

The anatomical surface generating step 102 may include scanning a subject (such as a human being, a vertebrate animal, or any other structure) while the subject is in a rest pose. In the embodiment wherein the subject is a person, the person's body is scanned while the person poses in a rest position with outstretched arms. Scanning the subject yields plain cloud data including a number of points defining a model of the subject. Based on the proportions of the scanned topology, a modeler may create models of anatomical elements using the scanned topology. An anatomical NURBS patch surface representing the internal anatomy (e.g., a skeleton, musculature, ligaments, and other tissue) of the scanned subject may be constructed manually by a user based on the plain cloud data.

In step 106, the animation system generates and arranges a plurality of vascular patches to form a vascular patch surface representing a vascular structure to be attached to the anatomical structure in the rest position, each of the vascular patches having an associated resolution defined by an associated array or hull of control points. In one embodiment, each of the vascular patches is generated as a NURBS patch having an associated resolution defined by an associated number of (CV) points. As for the anatomical patch surface, the vascular patch surface may be generated based on the scan of the subject in the rest pose. The vascular NURBS patches may be generated automatically based on the scan and then edited by a modeler by reconfiguring the control hulls of the patches in accordance with a semi-manual process. The process of defining the control hull of a NURBS patch is referred to as parameterization and is well known. The CV points of a NURBS patch define a grid which need not be a uniform grid as discussed further below. In the described embodiment, the control hulls of each of the vascular patches is configured to form a substantially cylindrical closed patch surface forming a vascular structure having a substantially circular transverse cross section. In alternative embodiments of the present invention, the control hulls of each of the vascular patches may be configured to form a closed patch surface forming a structure having a closed transverse cross section of any shape such as a polygon. A modeler of the vascular patch surface may select a resolution for each patch based on the desired level of detail required to model the associated vascular structure.

A principle object of the vascular effect animation process of the present invention is to generate natural looking images of a vascular structure attached to an animated understructure. As further explained below, a natural looking effect can be achieved by creating the appearance of elasticity in the a vascular structure by defining "springs" between associated pairs of the vascular CV points in order to achieve an elasticity effect. Each of the springs is defined by a mathematical function representing a potential force that may be exerted between the associated pairs of vascular CV points as a function of the distance between them.

In step 108, the system generates a plurality of intra-patch springs for each vascular CV point of each of the vascular patches, each intra-patch spring defining a potential force between the associated vascular CV point and a corresponding other CV point of the same vascular patch.

From step 108, the process 100 proceeds to execute a binding sub-process 112 for binding the vascular patches to associated binding points of the anatomical structure. The binding sub-process 112 begins with a step 116 in which the system determines a binding point associated with each CV point of each vascular patch. As further described below, the control points of each vascular patch include at least one transverse cross sectional subset of control points that are disposed proximate an associated transverse cross section of the vascular structure. In accordance with the present invention, each control point of a transverse cross sectional subset has a common binding point associated therewith. This particular aspect of the binding sub-process 112 provides a solution to the aforementioned problem of flattening of the vascular structure during a deformation phase of the animation process as further explained below. In a preferred embodiment, the binding point is defined as the closest point on the surface of the closest one of the anatomical patches to a selected one of the CV points of the transverse cross sectional subset of CV points.

For each CV point, an optimal algorithm is used for finding the closest point on the surface of the closest one of the anatomical patches. In one embodiment, the vascular effect plug-in utilizes a function provided in the library of the modeling program (e.g., Maya) for determining the closest point on the surface of the closest anatomical patch. Further details of step 116 are described below.

From step 116, the binding sub-process 112 proceeds to step 120 in which the system determines anchor point information indicating an anchor point associated with each of the CV points of each vascular patch. Each anchor point defines the location of the associated CV point relative to its associated binding point while the associated closest anatomical patch is disposed in the rest position. The anchor point information essentially indicates the initial rest position of the CV point relative to its associated binding point on the surface of the associated closest anatomical patch in the rest position.

As described above, each of the anatomical patches is a NURBS patch having an associated (u, v) coordinate system defined by a u-axis and a v-axis. Also, as explained in further detail below, the anchor point associated with each of the CV points is defined by: determining a normal vector that is normal to the surface of the associated closest anatomical patch at the associated binding point; determining a u-tangent to the surface of the associated closest anatomical patch along the u-axis at the associated binding point; and determining a v-tangent to the surface of the associated closest anatomical patch along the v-axis at the associated binding point. The normal vector, the u-tangent, and the v-tangent define an associated binding point reference coordinate system for the associated anchor points. The position of the anchor point is defined relative to the binding point using the associated binding point reference coordinate system. Because each control point of a transverse cross sectional subset has a common binding point associated therewith, each of the anchor points associated with one of the control points of the subset is defined relative to the common binding point using an associated common binding point reference coordinate system. Note that the binding sub-process 112 is only performed once to establish the binding positional relationship between each of the CV points of each vascular patch and its associated binding point on the closest one of the anatomical patches.

Figure 3:
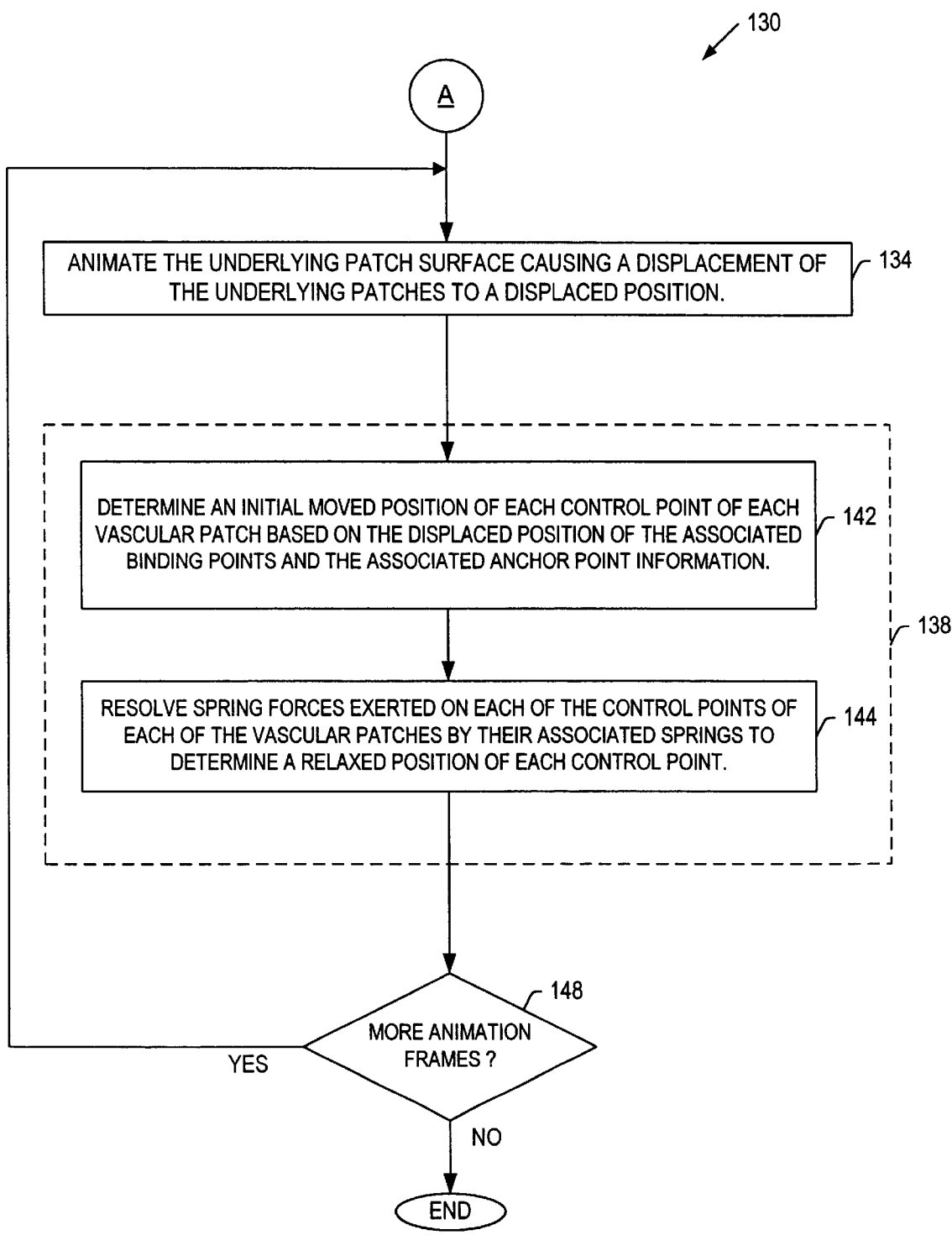

FIG. 3 shows a flow diagram generally illustrating further steps at 130 of the vascular effect animation process 100 (FIG. 2). The process proceeds from "A" (from FIG. 2) to execute an animation step 134 for animating the anatomical structure causing a displacement in the position of at least one of the anatomical patches relative to the rest positions of the anatomical patches, the animation step 134 resulting in a deformed anatomical structure. Within the context of the depicted process, the animation step 134 is performed to generate an image of the anatomical structure in a next frame of the animated graphical sequence. Animation of the anatomical patch surface is executed in accordance with well-known techniques.

From step 134, the process proceeds to execute a deformation sub-process 138 which includes two phases; a movement phase, and a relaxation phase. During the movement phase, the anchor point associated with each vascular CV point is moved and the associated vascular CV point is moved along with it. The moving of the CV points causes a deformation of at least a portion of the springs resulting in spring restoring forces being exerted on associated CV points. During the relaxation phase, the vascular CV point can move away from the anchor point subject to the forces exerted by the intra-patch springs defined in step 108 (FIG. 2). Finally, the system resolves the spring forces exerted on each of the vascular CV points of each vascular patch by their associated springs to determine a relaxed position of each vascular CV point. Note that the deformation process 138 is executed every time the position of the anatomical patch surface is changed in accordance with the animation step 134.

The deformation sub-process 138 begins with a step 142 in which the system determines an initial moved position for each vascular CV point of each vascular patch based on the displaced position of the associated binding point as a result of the animation step 134, and the associated binding point positional information. In the preferred embodiment, the system determines the moved position for each of the CV points based on the associated binding point, the associated anchor point, and a displacement in the position of the associated closest anatomical patch as a result of the animation step 134.

The movement step 142 includes moving all of the anchor points with respect to the anatomical NURBS patches taking into account the changed orientation of the anatomical patch and its position. In the preferred embodiment, the system determines the moved position for each of the CV points by: reading the stored patch information and the binding point information associated with a particular one of the CV points; determining a displaced reference coordinate system of the associated closest anatomical patch by determining a displaced normal vector, a displaced u-tangent, and a displaced v-tangent to the surface of the associated closest anatomical patch at the associated binding point with the closest anatomical patch being in the displaced position relative to the associated rest position; reading the anchor point position information associated with the particular CV point; and determining a moved position of the particular CV point based on the anchor point position information and the displaced reference coordinate system. This moving step is explained in further detail below.

After the vascular CV points are moved to initial positions in step 142 based on the displaced position of the associated binding points and the associated anchor point information, the springs defined between the vascular CV points exert forces on the vascular CV points. These spring forces are resolved in the relaxation step 144. The change in the distance between vascular CV points as a result of the performance of the movement step 142 deforms the springs which results in a restoring force which tends to move the associated CV points together. The relaxation step includes resolving this system of forces to an equilibrium state. The force exerted on each vascular CV point is computed and each of the vascular CV points is moved until a certain threshold of equilibrium is reached. Note that adjusting the strength of the springs defined in step 108 (FIG. 2) allows variations in the effective elasticity of the vascular topology. Also note that the distance between the anchor point and its associated vascular CV point is just a rigid distance that acts like a pin. There is no spring defined between the vascular CV point and the anchor point or between the vascular CV point and its associated binding point.

After execution of the deformation sub-process 138, the process proceeds to 148 at which it is determined whether there are more animation frames to be processed and sequenced and if so, the process proceeds back to step 134 to animate the anatomical patch surface causing a further displacement of the anatomical patch to a further displaced position. If there are no more animation frames to process, the process 100 ends.

FIG. 4 shows a block diagram generally illustrating an array at 200 of CV points 202 of a vascular NURBS patch. Each of a plurality of associated pairs of the CV points 202 includes a plurality of different types of intra-patch springs defining potential forces therebetween. In the depicted array 200, each of the vascular CV points 202 is disposed within a substantially regular array of CV points. However, this is not the general case because CV points disposed proximate the patch boundary often deviate from the regular array positioning as further explained below. As mentioned above, the step 108 (FIG. 2) provides for defining at least one intra-patch spring between a corresponding pair of selected CV points 202 of at least one of the vascular patches.

The springs include: structural, or stretching, springs 204 defining potential forces between associated pairs of adjacent CV points that are arranged vertically and horizontally within the regular array of CV points; shearing springs 206 defining potential forces between associated pairs of adjacent CV points 202 that are arranged diagonally within the regular array of CV points; and bending springs 208 defining potential forces between associated pairs of CV points 202 that are arranged vertically and horizontally and one point apart within the regular array of CV points. Each of the associated pairs of CV points 202 having bending springs 208 defined therebetween has at least one other CV point 202 disposed therebetween that is not subject to the associated bending spring.

The structural springs 204 define an elasticity of the vascular structure formed by the patch. Note that higher spring coefficient values for the structural springs 204 will prevent the vascular layer from stretching, while lower spring coefficient values for the structural springs 204 facilitate stretching of the vascular structure. The shearing springs 206 prevent shearing of the vascular structure, that is keep the iso-parameters on the vascular patch orthogonal, during execution of the deformation sub-process 138 (FIG. 3). The bending springs 208 prevent bending of the vascular structure during execution of the deformation sub-process 138 (FIG. 3). Note that higher spring coefficient values for the bending springs 208 prevent the vascular structure from bending.

The springs 204, 206, and 208 are implemented as mathematical relationships defining potential forces between the associated CV points. In one embodiment, each of the three spring types uses the same force function but has different coefficients. Also in an embodiment, the springs 204, 206, and 208 are defined automatically by the Maya plug-in. In this embodiment, the user of the Maya plug-in may edit the springs manually.

FIG. 5 shows a perspective view of a NURBS patch at 220 having a plurality of CV points 202 and having a (u, v) coordinate system defined by a u-axis 222 and a v-axis 224. As shown, the CV points 202, which provide a control hull, are configured to form a substantially cylindrical closed surface 225 of a vascular structure 226 having a circular cylindrical transverse cross section. The surface 225 of the patch 220 is closed along a longitudinal axis 227 of the vascular structure as illustrated by CV points 202 along a first edge 228 of the patch being folded toward CV points along an opposite edge 229 of the patch. In the depicted example, the surface 225 is closed along the u-axis 222. However, the surface of the vascular structure may also be closed along the v-axis 224 in accordance with the present invention in which case a transverse cross section would be taken along the u-axis 222.

FIG. 6 shows a transverse cross sectional view at 230 of the vascular structure 226 (FIG. 5) taken along the line 6—6 (FIG. 5) which is parallel to the v-axis 224 in the depicted example. A transverse cross sectional subset 232 of CV points 202 are disposed proximate the depicted transverse cross section of the vascular structure. As mentioned, each of the CV points of the subset 232 is bound to a common binding point in accordance with the present invention as further explained below.

FIG. 7 shows a perspective view at 260 of a vascular patch at 220 having a plurality of CV points 202 configured to form a vascular structure 266 that is disposed proximate a top surface of an associated closest anatomical patch 226, the view illustrating binding positional relationships between anchor points of the vascular patch and associated binding points on the surface of the associated closest anatomical patch as further explained below.

As described above, each of the patches 220 and 266 is a NURBS patch including a (u, v) coordinate system having a u-axis 267 and a v-axis 268 relative to the NURBS patch. It is assumed that the patches 220 and 266 are disposed in rest positions as described above with respect to the process 100 (FIG. 2). Assume that each CV point 202 of the vascular NURBS patch 220 is mapped to an associated anchor point, and that each of the CV points and its associated anchor point is coincident in the rest position. Each of the anchor points has an associated binding point which is a selected point on the surface of the selected anatomical NURBS patch. Also, as stated above, each of the CV points of a transverse cross sectional subset has a common binding point. In one embodiment, the binding point associated with each CV point of a subset is determined as the closest point on the surface of the closest patch to a selected one of the first CV points of the subset.

As described above, the CV points 202 of the vascular patch 220 include at least one transverse cross-sectional subset 270 of the control points 202 that are disposed proximate a transverse cross section of the vascular structure. In the depicted example, the subset 270 includes three exemplary CV points 272, 274, and 276 which are referred to below for purposes of discussion. Each of the CV points of the subset 270 is associated with a common binding point that is a closest point on the surface 267 of the closest anatomical patch 266 to a selected one of the CV points of the subset. In the described example, a binding point 280 associated with each of the CV points of the subset 270 is determined as the closest point on the surface 267 of the closest patch 266 to the first CV point 272 of the subset.

A normal vector 282 is normal to the surface 267 of the anatomical patch 266 at the binding point 280. A u-tangent line 284 is tangent along the u-axis to the surface of the anatomical patch 266 at the binding point 280, and a v-tangent line 286 is tangent along the v-axis to the surface of the anatomical patch 266 at the binding point 280. In one embodiment, the normal vector 282 is defined in world space which is independent of each of the (u, v) coordinate systems of the NURBS patches 220 and 266.

As described above, the step 120 (FIG. 2) of determining an anchor point associated with each of the CV points includes: determining a normal vector 282 that is normal to the surface of the associated closest anatomical patch 266 at the associated binding point 280; determining a u-tangent 286 to the surface of the associated closest anatomical patch along the u-axis at the associated binding point 280; and determining a v-tangent 286 to the surface of the associated closest anatomical patch along the v-axis 268 at the associated binding point 280. The normal vector 282, u-tangent line 286, and v-tangent line 284 define a three-value common binding point reference coordinate system (X=Δu, Y=Δv, distance d along normal vector) for the each of the anchor points associated with the CV points 270, 272, and 274 of the transverse cross-sectional subset 270 of points. The final part of the step 120 (FIG. 2) of determining an anchor point includes defining the position of the anchor point relative to the binding point using the associated binding point reference coordinate system (Δu, Δv, d) defined for the associated anchor point as described above.

The position of each anchor point relative to its associated binding point may be defined as a (Δu, Δv, d) using the associated binding point reference coordinate system defined for the associated anchor point. Because each of the CV points 202 of the subset 270 share the common binding point 280, each of the CV points of the subset also share a common binding point reference coordinate system defined by the v-tangent line 284, u-tangent line 286, and normal vector 282. However, each of the anchor points associated with CV points of the subset 270 has different coordinate values (Δu, Δv, d) in the common binding point reference coordinate system. The coordinates of the anchor point associated with the first CV point 272 include: Δu and Δv coordinate values of zero; and a d coordinate value determined by a distance 290 between the binding point 280 and the first CV point 272 along the normal vector 282. The coordinates of the anchor point associated with the second CV point 274 include: a Δu coordinate value determined by the distance 296 between the binding point 280 and the second CV point 274 along the u-tangent line 286; a Δv coordinate value of zero determined by the zero distance between the binding point 280 and the second CV point 274 along the v-tangent line 284; and a d-coordinate value determined by the distance 292 between the binding point 280 and the second CV point 274 along the normal vector 282. The coordinates of the anchor point associated with the third CV point 276 include: a Δu coordinate value determined by the distance 298 between the binding point 280 and the third CV point 276 along the u-tangent line 286; a Δv coordinate value of zero determined by the zero distance between the binding point 280 and the third CV point 276 along the v-tangent line 284; and a d-coordinate value determined by the distance 294 between the binding point 280 and the CV point 276 along the normal vector 282. Note that the (u, v) coordinate systems of the patches 220 and 266 are aligned in the depicted example. However, the (u, v) coordinate systems of the patches 220 and 266 need not be aligned in accordance with the present invention.

FIG. 8 is a table diagram generally illustrating binding map information generated based on the binding positional relationships between the anchor points and associated binding points. As explained above, the binding sub-process 112 (FIG. 2) includes generating and storing anchor point mapping information associated with each of the vascular CV points.

The binding positional mapping information 300 includes: a plurality of CV point entries 302 each having: CV point information 304 indicating an associated CV point of a vascular patch; and associated binding positional information 306 indicating an associated anchor point and binding point mapping for the associated CV point. The binding positional information 306 includes: patch information 308 indicating the closest anatomical NURBS patch to the associated CV point; binding point position information 310 indicating the (u, v) position of the associated binding point on the associated closest anatomical NURBS patch; and anchor point position information 312 having coordinates indicating the position of the associated anchor point relative to the associated binding point using the (Δu, Δv, d) reference coordinate system defined for the associated anchor point(s) as described above.

The binding positional mapping information 300 is generated and stored in system memory 18 (FIG. 1) during execution of the binding sub-process 112 (FIG. 2), and read from system memory during the movement step 142 (FIG. 3) for moving each of the CV points of each vascular patch based on the associated binding positional relationship for the purpose of establishing an initial position of the CV points of each vascular patch during the deformation sub-process 138 (FIG. 3).

Note that the(Δu, Δv, d) binding point reference coordinate system defined for each of the anchor points must be re-calculated upon every frame of the animation process during the movement step 142 (FIG. 3) as the position of the associated closest anatomical patch is moved, or translated. The step 142 (FIG. 3) of moving each of the CV points based on the associated binding positional relationship includes: reading the patch information 308 and the binding point information 310 associated with a particular one of the CV points 302; determining a displaced, or translated, reference coordinate system for the associated anchor point by determining a displaced normal vector, a displaced u-tangent line, and a displaced v-tangent line to the surface of the associated closest anatomical patch at the associated binding point with the closest anatomical patch being in the displaced, or translated, position relative to the associated rest position; reading the anchor point position information 312 associated with the particular CV point; and determining a moved position of the particular CV point based on the anchor point position information 312 and the displaced, or translated, binding point reference coordinate system.

The above described system and method provides for generating high quality graphical images of a vascular structure attached to an animated anatomical structure, wherein the vascular structure is modeled by parametric surface patches, wherein the vascular layer may have an elastic quality, and wherein the transverse cross section of the vascular structure is not flattened during animation.

Although the present invention has been particularly shown and described above with reference to a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A process for generating animated graphical images of a vascular structure attached to an anatomical structure comprising the steps of:

generating and arranging a plurality of anatomical patches in rest positions to form an anatomical patch surface representing an anatomical structure disposed in a rest position;

generating and arranging at least one vascular patch over said anatomical structure in said rest position, said vascular patch having an associated array of control points configured to form a closed surface of a vascular structure having a closed transverse cross section; and establishing a binding positional relationship between at least a portion of said control points and said anatomical patch surface by determining binding points on the surface of at least one selected anatomical patch in a rest position, said control points including at least one transverse cross-sectional subset of control points that are disposed proximate an associated transverse cross-section of said vascular structure, each control point of said subset having a common binding point.

2. A process for generating animated graphical images as recited in claim 1 wherein said control points of each of said vascular patches are configured to form a substantially cylindrical surface of a vascular structure having a substantially circular transverse cross section.

3. A process for generating animated graphical images as recited in claim 1 wherein said common binding point is located on a closest point on the surface of said selected anatomical patch to a selected one of said control points of said transverse cross-sectional subset.

4. A process for generating animated graphical images as recited in claim 1 further comprising the steps of:

animating said anatomical structure causing a translation in the position of said selected anatomical patch relative to said rest position, and resulting in a translated anatomical patch surface; and deforming said vascular patch by moving at least a portion of said control points of said vascular patch based on said associated binding positional relationships and said translation in the position of said selected anatomical patch.

5. A process for generating animated graphical images as recited in claim 4 further comprising the steps of:

defining at least one intra-patch spring between a corresponding pair of selected control points of at least one of said vascular patches, each said intra-patch spring defining a potential force between said corresponding pair of selected control points, wherein said step of deforming said vascular patch by moving at least a portion of said control points results in at least a portion of said springs being deformed causing spring restoring forces to be exerted on associated ones of said control points; and computing and resolving said spring restoring forces to determine a relaxed position for each of said control points.

6. A process for generating animated graphical images as recited in claim 5 wherein each of said control points is disposed within a substantially regular array of control points, and wherein each of said springs is selected from a group of spring types comprising:

a structural spring defining a potential force between an associated pair of adjacent control points that are arranged either vertically or horizontally within the regular array of control points;

a shearing spring defining a potential force between an associated pair of adjacent control points that are arranged diagonally within the regular array of control points; and a bending spring defining a potential force between an associated pair of control points that are arranged either vertically or horizontally within the regular array of control points, the associated pair of control points having a bending spring defined therebetween and also having at least one other control point disposed therebetween.

7. A process for generating animated graphical images as recited in claim 1 wherein said step of establishing a binding positional relationship between each of said control points and said associated closest anatomical patch in said rest position further comprises:

determining an anchor point associated at least a portion of said control points, each said anchor point defining the location of said associated control point relative to its associated binding point with said associated closest anatomical patch being disposed in said rest position.

8. A process for generating animated graphical images as recited in claim 7 wherein said step of moving each of said control points based on said binding positional relationships further comprises determining a moved position for each of said control points based on said associated binding point, said associated anchor point, and a displacement in the position of said associated closest anatomical patch.

9. A process for generating animated graphical images as recited in claim 1 wherein each of said anatomical patches is a non-uniform rational B-spline (NURBS) patch having a (u,v) coordinate system defining a u-direction and a v-direction relative to said NURBS patch, and wherein said step of determining an anchor point associated with each of said control points of said subset further comprises:

determining a normal vector that is normal to the surface of said associated closest anatomical patch at said associated binding point;

determining a u-tangent to the surface of said associated closest anatomical patch along the u-direction at said associated binding point;

determining a v-tangent to the surface of said associated closest anatomical patch along the v-direction at said associated binding point, said normal vector, said u-tangent, and said v-tangent defining an associated binding point reference coordinate system for said associated anchor point; and defining the position of said anchor point relative to said binding point using said associated binding point reference coordinate system.

10. A process for generating animated graphical images as recited in claim 9 wherein said normal vector is defined in world space.

11. A process for generating animated graphical images as recited in claim 9 wherein said step of establishing a binding positional relationship further comprises the step of generating and storing anchor point mapping information associated with each of said vascular control points, said anchor point mapping information including:

patch information indicative of said associated selected anatomical patch;

binding point information indicative of said associated binding point; and anchor point position information indicative of the position of said anchor point relative to said binding point in terms of said associated binding point reference coordinate system of said associated selected anatomical patch in said rest position.

12. A process for generating animated graphical images as recited in claim 11 wherein said step of moving each of said control points based on said associated binding positional relationship comprises:

reading said patch information and said binding point information associated with a particular one of said control points;

determining a displaced binding point reference coordinate system by determining a displaced normal vector, a displaced u-tangent, and a displaced v-tangent to the surface of said associated selected anatomical patch at said associated binding point with said selected anatomical patch being in said displaced position relative to said associated rest position;

reading said anchor point position information associated with said particular control point; and determining a moved position of said particular control point based on said anchor point position information and said displaced reference coordinate system.

13. A process for generating animated graphical images as recited in claim 1 wherein at least a portion of said vascular patches have varying resolutions defined by the associated number of control points in said associated arrays.

14. A machine readable storage device having stored therein encoding instructions for executing a process of generating animated graphical images of a vascular structure attached to an anatomical structure comprising the steps of:

generating and arranging a plurality of anatomical patches in rest positions to form an anatomical patch surface representing an anatomical structure disposed in a rest position;

generating and arranging at least one vascular patch over said anatomical structure in said rest position, said vascular patch having an associated array of control points configured to form a closed surface of a vascular structure having a closed transverse cross section; and establishing a binding positional relationship between at least a portion of said control points and said anatomical patch surface by determining binding points on the surface of at least one selected anatomical patch in a rest position, said control points including at least one transverse cross-sectional subset of control points that are disposed proximate an associated transverse cross-section of said vascular structure, each control point of said subset having a common binding point.

15. A machine readable storage device as recited in claim 14 wherein said control points of each of said vascular patches are configured to form a substantially cylindrical surface of a vascular structure having a substantially circular transverse cross section.

16. A machine readable storage device as recited in claim 14 wherein said common binding point is located on a closest point on the surface of said selected anatomical patch to a selected one of said control points of said transverse cross-sectional subset.

17. A machine readable storage device as recited in claim 14 further comprising the steps of:

animating said anatomical structure causing a translation in the position of said selected anatomical patch relative to said rest position, and resulting in a translated anatomical patch surface; and deforming said vascular patch by moving at least a portion of said control points of said vascular patch based on said associated binding positional relationships and said translation in the position of said selected anatomical patch.

18. A machine readable storage device as recited in claim 17 further comprising the steps of:

defining at least one intra-patch spring between a corresponding pair of selected control points of at least one of said vascular patches, each said intra-patch spring defining a potential force between said corresponding pair of selected control points, wherein said step of deforming said vascular patch by moving at least a portion of said control points results in at least a portion of said springs being deformed causing spring restoring forces to be exerted on associated ones of said control points; and computing and resolving said spring restoring forces to determine a relaxed position for each of said control points.

19. A machine readable storage device as recited in claim 18 wherein each of said control points is disposed within a substantially regular array of control points, and wherein each of said springs is selected from a group of spring types comprising:

a structural spring defining a potential force between an associated pair of adjacent control points that are arranged either vertically or horizontally within the regular array of control points;

a shearing spring defining a potential force between an associated pair of adjacent control points that are arranged diagonally within the regular array of control points; and a bending spring defining a potential force between an associated pair of control points that are arranged either vertically or horizontally within the regular array of control points, the associated pair of control points having a bending spring defined therebetween and also having at least one other control point disposed therebetween.

20. A machine readable storage device as recited in claim 14 wherein said step of establishing a binding positional relationship between each of said control points and said associated closest anatomical patch in said rest position further comprises:

determining an anchor point associated at least a portion of said control points, each said anchor point defining the location of said associated control point relative to its associated binding point with said associated closest anatomical patch being disposed in said rest position.

21. A machine readable storage device as recited in claim 20 wherein said step of moving each of said control points based on said binding positional relationships further comprises determining a moved position for each of said control points based on said associated binding point, said associated anchor point, and a displacement in the position of said associated closest anatomical patch.

22. A machine readable storage device as recited in claim 14 wherein each of said anatomical patches is a non-uniform rational B-spline (NURBS) patch having a (u,v) coordinate system defining a u-direction and a v-direction relative to said NURBS patch, and wherein said step of determining an anchor point associated with each of said control points of said subset further comprises:

determining a normal vector that is normal to the surface of said associated closest anatomical patch at said associated binding point;

determining a u-tangent to the surface of said associated closest anatomical patch along the u-direction at said associated binding point;

determining a v-tangent to the surface of said associated closest anatomical patch along the v-direction at said associated binding point, said normal vector, said u-tangent, and said v-tangent defining an associated binding point reference coordinate system for said associated anchor point; and defining the position of said anchor point relative to said binding point using said associated binding point reference coordinate system.

23. A machine readable storage device as recited in claim 22 wherein said normal vector is defined in world space.

24. A machine readable storage device as recited in claim 22 wherein said step of establishing a binding positional relationship further comprises the step of generating and storing anchor point mapping information associated with each of said vascular control points, said anchor point mapping information including:

patch information indicative of said associated selected anatomical patch;

binding point information indicative of said associated binding point; and anchor point position information indicative of the position of said anchor point relative to said binding point in terms of said associated binding point reference coordinate system of said associated selected anatomical patch in said rest position.

25. A machine readable storage device as recited in claim 24 wherein said step of moving each of said control points based on said associated binding positional relationship comprises:

reading said patch information and said binding point information associated with a particular one of said control points;

determining a displaced binding point reference coordinate system by determining a displaced normal vector, a displaced u-tangent, and a displaced v-tangent to the surface of said associated selected anatomical patch at said associated binding point with said selected anatomical patch being in said displaced position relative to said associated rest position;

reading said anchor point position information associated with said particular control point; and determining a moved position of said particular control point based on said anchor point position information and said displaced reference coordinate system.

26. A system for executing a process of generating animated graphical images of a vascular structure attached to an anatomical structure comprising:

means for generating and arranging a plurality of anatomical patches in rest positions to form an anatomical patch surface representing an anatomical structure disposed in a rest position;

means for generating and arranging at least one vascular patch over said anatomical structure in said rest position, said vascular patch having an associated array of control points configured to form a closed surface of a vascular structure having a closed transverse cross section; and means for establishing a binding positional relationship between at least a portion of said control points and said anatomical patch surface by determining binding points on the surface of at least one selected anatomical patch in a rest position, said control points including at least one transverse cross-sectional subset of control points that are disposed proximate an associated transverse cross-section of said vascular structure, each control point of said subset having a common binding point.

27. A system as recited in claim 26 wherein said control points of each of said vascular patches are configured to form a substantially cylindrical surface of a vascular structure having a substantially circular transverse cross section.

28. A system as recited in claim 26 wherein said common binding point is located on a closest point on the surface of said selected anatomical patch to a selected one of said control points of said transverse cross-sectional subset.

29. A system as recited in claim 26 further comprising:

means for animating said anatomical structure causing a translation in the position of said selected anatomical patch relative to said rest position, and resulting in a translated anatomical patch surface; and means for deforming said vascular patch by moving at least a portion of said control points of said vascular patch based on said associated binding positional relationships and said translation in the position of said selected anatomical patch.

30. A system as recited in claim 29 further comprising:

means for defining at least one intra-patch spring between a corresponding pair of selected control points of at least one of said vascular patches, each said intra-patch spring defining a potential force between said corresponding pair of selected control points, wherein said means for deforming said vascular patch by moving at least a portion of said control points results in at least a portion of said springs being deformed causing spring restoring forces to be exerted on associated ones of said control points; and means for computing and resolving said spring restoring forces to determine a relaxed position for each of said control points.

* * * * *